Feb. 16, 1937.   R. MELVILLE   2,070,614
BRAKING MECHANISM
Filed May 22, 1935   3 Sheets-Sheet 1
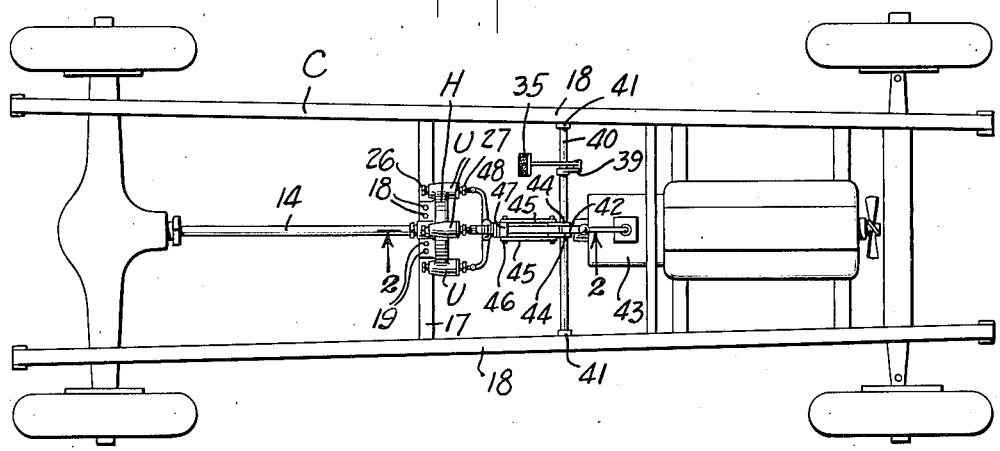
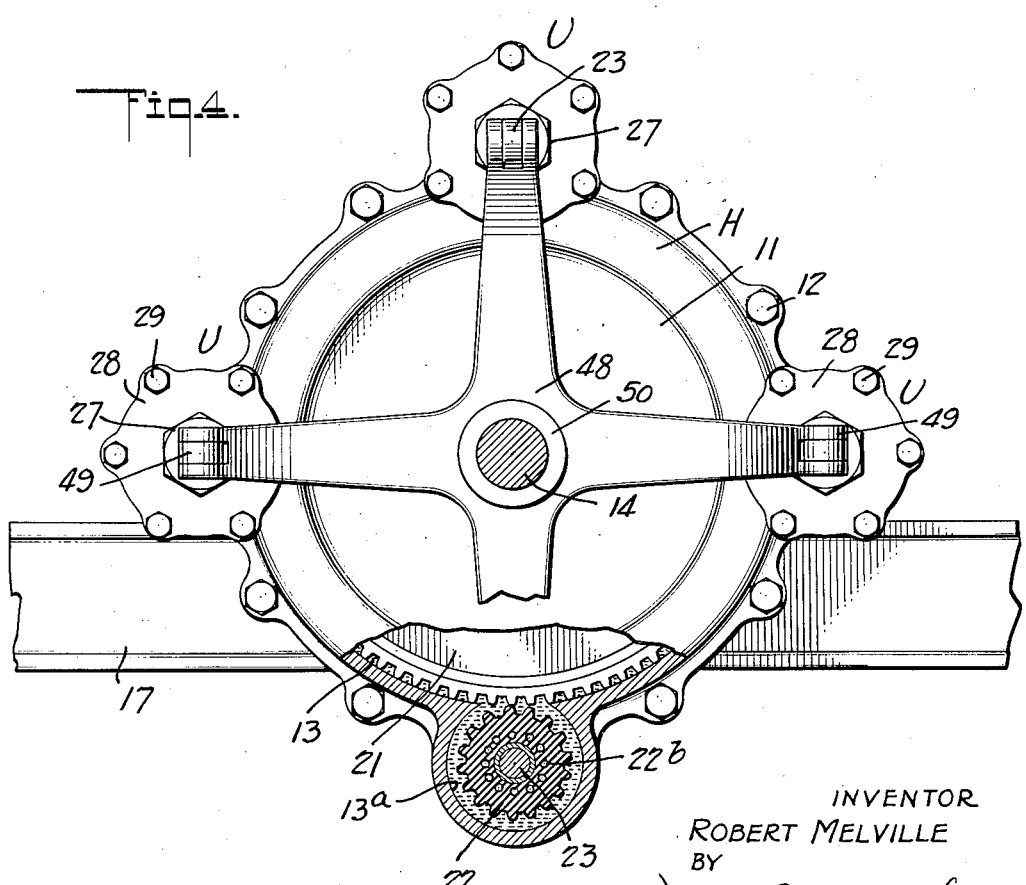
INVENTOR
ROBERT MELVILLE Feb. 16, 1937. R. MELVILLE 2,070,614
BRAKING MECHANISM
Filed May 22, 1935 3 Sheets-Sheet 2
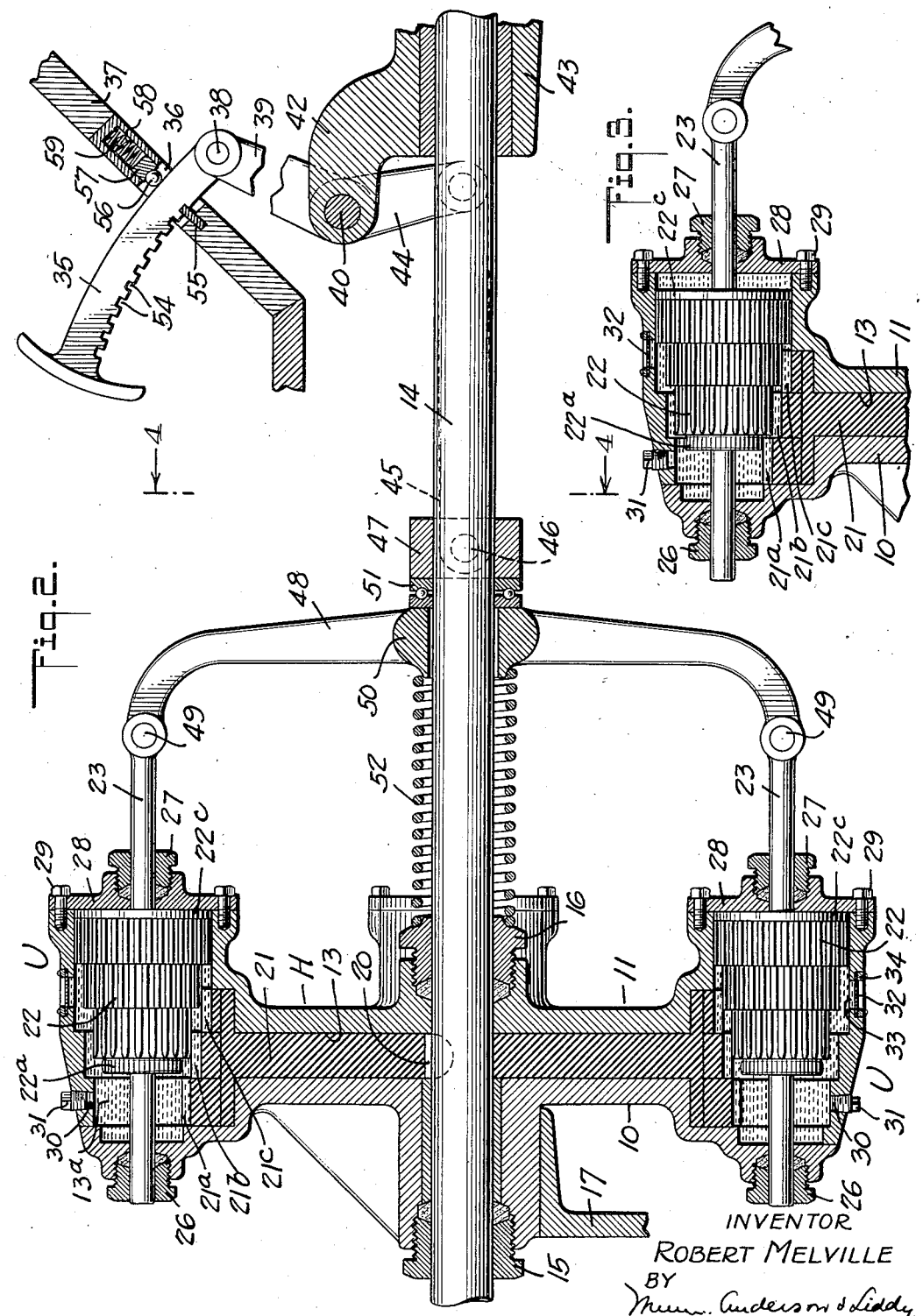
INVENTOR
ROBERT MELVILLE
BY
Anderson & Liddy
ATTORNEYS

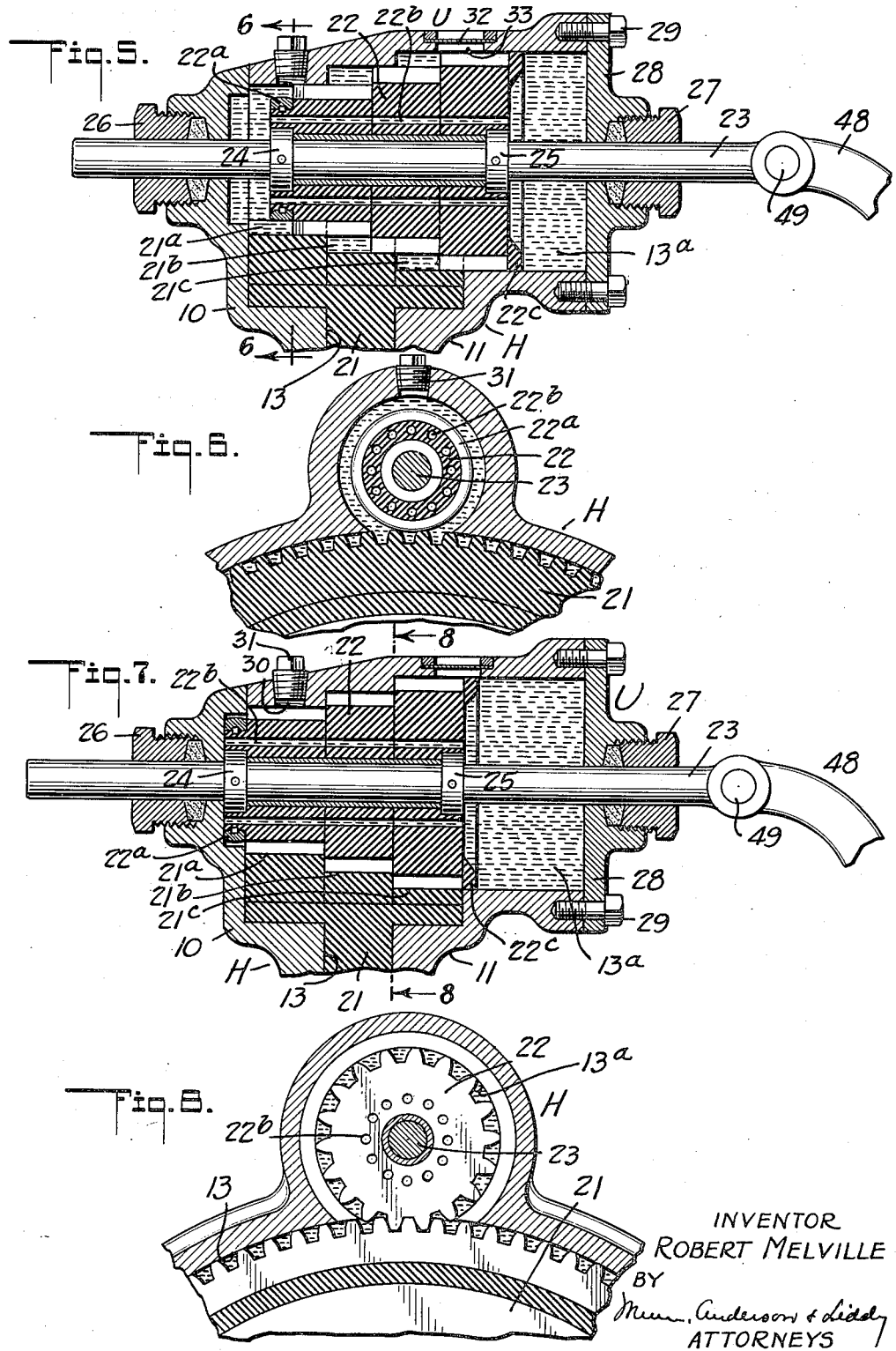

Patented Feb. 16, 1937

2,070,614

UNITED STATES PATENT OFFICE 2,070,614

BRAKING MECHANISM

Robert Melville, Challis, Idaho

Application May 22, 1935, Serial No. 22,873

8 Claims. (Cl. 188—92)

This application is a continuation in part of my application Serial No. 721,783, filed April 21, 1934.

The invention relates generally to braking systems, and more particularly to fluid brake mechanisms.

An object of this invention is to provide a novel fluid brake mechanism by which any amount of braking force from a minimum to a maximum can be effected with the utmost ease by varying the displacement of fluid within a sealed chamber in such manner that the fluid will coact with a gear train in creating the braking force upon a driven element to be braked.

Another object of this invention is to provide a novel fluid brake mechanism capable of a wide range of use and which is absolutely positive in action to create an extremely powerful braking force up to a complete locking of a driven element against rotation and to provide a full release of such element to entirely eliminate any frictional drag upon the element, all the while enabling a braking application to be smoothly graduated in intensity from a minimum to a maximum or vice versa.

Another object of the invention is to provide in a brake mechanism of the above described character, a means which automatically functions to synchronize the speeds of toothed driven and control members prior to meshing the teeth to create the braking force, whereby to prevent clashing of the teeth with the attendant wear of and damage to the teeth.

Another object of the invention is to provide a fluid brake mechanism which is equally efficient in the braking of a rotary driven element irrespective of the direction of rotation of the element.

Another object of this invention is to provide a novel fluid braking mechanism embodying extremely simple means for varying the amount of fluid displacement and hence the intensity of the braking force, and wherein variations in internal and external pressures induced by temperature changes is automatically compensated for, so that the attendant variations in the volume of liquid within the sealed chamber of the mechanism will not burst the chamber or cause inefficient operation.

Other objects and advantages will appear from the following specifications.

In the drawings:

Figure 1 is a plan view showing one form of fluid brake mechanism embodying this invention and applied to a motor vehicle;

Figure 2 is an enlarged vertical axial sectional view taken on the line 2—2 of Figure 1 and illustrating the fully released position of the mechanism;

Figure 3 is a fragmentary view of a portion of the mechanism shown in Figure 2, and illustrating the synchronizing means in operation;

Figure 4 is a vertical transverse sectional view taken on the line 4—4 of Figure 2, and with a portion of the gear housing broken away to show gearing therein;

Figure 5 is an enlarged fragmentary sectional view illustrating the position of the mechanism to obtain partial braking;

Figure 6 is a transverse sectional view taken on the line 6—6 of Figure 5;

Figure 7 is a view similar to Figure 5, and illustrating the position of the mechansm to obtain maximum braking;

Figure 8 is a transverse sectional view taken on the line 8—8 of Figure 7.

Reference will be first had particularly to Figures 1 to 8, inclusive.

In carrying the invention into practice, a generally circular housing H is provided and is composed of two sections 10 and 11 suitably secured together by bolts 12 (Figure 4). These sections coact to define a liquid chamber 13; and a driven element, in this instance the propeller shaft 14 of a motor vehicle (Figure 1), extends axially through the sections and the intervening chamber, suitable packing glands 15 and 16 surrounding the shaft and coacting therewith and with the sections to prevent the leakage of liquid from the chamber around the shaft.

The housing H is rigidly supported on the chassis C so as to be stationary or non-rotatable with respect thereto. For this purpose a suitable cross member 17 is provided in the chassis frame 18, to which the housing is secured by fastening members 19, all as shown in Figure 1.

Fixed to the shaft 14 by a key 20 so as to closely fit within the central portion of the chamber 13 is a gear 21 which thus constitutes a part of the aforestated driven element for positive rotation with the shaft. The teeth of the gear 21 are stepped in a manner to form portions 21a, 21b and 21c of progressively different diameters which are complementarily related to the stepped teeth of each of a plurality of pinion gears 22 adapted to be simultaneously adjusted from the non-meshing position shown in Figure 2 through the partially meshed position shown in Figure 5, to the fully meshed position shown in Figures 7 and 8, or vice versa, all for the purpose of varying the displacement of liquid in the chamber 13, with corresponding variation in the braking force applied to the shaft 14. In order to simplify manufacture of the gears 21 and 22 they are preferably made in sections as shown in Figures 2 and 5, which sections can be welded or otherwise rigidly secured together to form unitary structures.

At the smaller end of each of the pinion gears is fixed, concentrically thereof, a ring 22a of yieldable material, such as rubber, which is of a diameter to ride over the teeth of the portion 21a of the gear 21 as the pinion gears are adjusted from the non-meshing position shown in Figure 2 to the synchronizing position shown in Figure 3. This initial driving engagement brings the pinion gears from positions of rest up to a peripheral speed corresponding to that of the gear 21 so as to insure that the gears will mesh smoothly. Clashing of the gears with the attendant excessive wear and danger of damaging the gear teeth is thus avoided.

The pinion gears 22 of which four are illustrated in the present embodiment are arranged at equally spaced points circumferentially about the driven gear 21, and each constitutes a part of a control unit U. As the several control units are of identical construction, a detailed description of one unit will suffice for all.

Each gear 22 is journaled to freely rotate upon a shifter shaft 23 between collars 24 and 25 fixed to the shaft. The shaft 23 is non-rotatable and is mounted in packing glands 26 and 27 for axial adjustment to correspondingly shift the gear 22 and thereby vary its meshing relationship with the gear 21. Each of the gears 22 operates in a radial enlargement of the chamber 13 forming an auxiliary chamber 13a stepped to correspond with the stepped form of the gear 22, and is provided with a circular series of axially extending passages 22b through which liquid in the chamber will be free to by-pass in the auxiliary chamber from one side of the gear to the other as shifting of the gear is effected.

It will be noted that the packing gland 26 of each unit U is supported by the section 10, whereas the packing gland 27 of each unit is supported by a cover plate 28 secured by bolts 29 to a cylindrical extension of the section 11 so as to close the open end of the extension through which the gear is adapted to be passed into the chamber 13 when assembling the mechanism. The teeth of the largest step of the gear 22 terminate short of the corresponding end of the gear so that the peripheral portion of such end forms a continuous flange 22c and has a running fit within the bore of the extension. A fluid, such as glycerine, castor oil or other liquid, is supplied to the chamber 13 through a filling opening 30 controlled by a plug 31 to completely fill all unoccupied space in the chamber; and in order to compensate for variations in the volume of the liquid caused by temperature changes or from other sources, one or more flexible diaphragms 32 spans a port 33 in the wall of the chamber, and is confined against displacement by a retaining ring 34 so that the diaphragm will at all times be exposed to the liquid in the chamber.

The shifter shafts 23 of the several units U are adapted to be simultaneously and correspondingly actuated by a foot pedal 35 extending through a slot 36 in the floor board 37 of the vehicle and being pivotally connected at 38 to the free end of a lever 39 fixed to a rock shaft 40 journaled in bearings 41—41 on the chassis frame 18 and in a center bearing 42 on the transmission casing 43. At opposite sides of the bearing 42 arms 44—44 are fixed to the rock shaft 40 and are pivotally connected to links 45—45 pivoted at 46—46 to a collar 47 freely mounted on the shaft 14.

A spider 48 having four equally spaced arms connected respectively at 49 to the shifter shafts 23 is provided with a hub 50 freely receiving the shaft 14. A ball thrust bearing 51 is interposed between the collar 47 and the hub 50 of the spider 48 for coaction therewith upon depression of the pedal 35, in shifting the several pinion gears 23 from non-meshing to meshing positions relative to the gear 22, against the action of a coil spring 52 surrounding the shaft 14 and abutting the hub 50 and the nut of the packing gland 16, all as clearly shown in Figure 2.

One longitudinal edge of the pedal arms 35 is provided with a series of notches 54, any one of which is adapted to receive a fixed detent 55 projecting into the slot 36. A ball 56 engaged by a follower block 57 mounted in the bore 58 of the floor board structure is urged by a coil spring 59 to ride upon the opposite longitudinal edge of the arm 53 so as to releasably retain the arm in latching engagement with the detent 55 and thereby maintain the gears 22 in the positions to which they are adjusted, yet permit the arm to be readily released upon rocking the arm about the pivot 38 sufficiently for the arm to clear the detent.

The operation of the braking mechanism is as follows:

Let it be assumed that the requisite amount of liquid has been supplied to the chamber 13 and the auxiliary chambers 13a and that the pinion gears 22 occupy the non-meshing or released position shown in Figure 2. In this position of adjustment with the pinion gears 22 clear of the driven gear 21, the latter will be free to rotate in the chamber 13 due to the fact that all liquid contained in the spaces between its teeth and the peripheral wall 60 of this chamber intermediate the auxiliary chambers 13a will be carried around with the driven gear, thus permitting free and unobstructed rotation of the latter by the shaft 14 so that no braking of the shaft occurs.

However, as the pedal 35 is depressed to simultaneously advance the several pinion gears 22 into mesh with the driving gear 21, following the action of the respective synchronizing rings 22a in bringing the speeds of the pinion gears up to that of the driving gear, displacement of liquid from between the meshing teeth commences and increases as the pinion gears are advanced further into mesh with the driven gear. This displacement of liquid creates a force resisting rotation of the pinion gears about their respective axes which resistance is applied through the driven gear 21 to the shaft 14 in setting up a braking action upon the shaft. This braking force naturally increases as the displacement of liquid increases from the initial meshing of the gears through the partial meshing thereof shown in Figures 5 and 6 to the full meshing of the gears shown in Figure 7 and 8, wherein communication between the chamber 13 and the auxiliary chambers 13a is completely disrupted so that the relatively non-compressible liquid trapped in the spaces between the teeth of the driven gear 21 will coact with the meshing teeth of the pinion gears 22 in preventing rotation of the latter. As the housing in which the pinion gears are journaled is stationary, and as the pinion gears are held by the trapped liquid against rotation about their respective axes as aforestated, it will be evident that the driven gear 21 and hence the driven shaft 14 will be locked against rotation, which constitutes the maximum braking action possible.

It will thus be manifest that the braking action upon the shaft 14 increases or decreases according as the displacement of liquid is increased or decreased by varying the meshed relationship of the pinion gears and the driven gear. The provision of the relatively large gear 21 and the relatively small pinion gears has the mechanical effect of producing great leverage so that the braking action is very powerful and can be obtained with but negligible manual effort.

Furthermore, the mechanism provides a brake for any power driven shaft, which will function with equal efficiency irrespective of the direction in which the shaft is rotating.

I claim:

1. Braking mechanism comprising a non-rotatable housing defining a liquid containing chamber; a driven gear rotatably mounted in said chamber; a plurality of shifter shafts arranged at circumferentially spaced points about the axis of the driven gear and extending into the chamber; control gears rotatably mounted on said shafts in the chamber and shiftable therewith to occupy a non-meshing position and various meshing positions with respect to said driven gear for coaction with the latter in varying the displacement of liquid in said chamber to accordingly vary the braking force applied to the driven gear; and means for simultaneously and correspondingly actuating the shifter shafts.

2. Braking mechanism comprising a fixed housing defining a central liquid containing chamber and a plurality of circumferentially spaced auxiliary liquid containing chambers arranged about said central chamber and in communication therewith; a driven gear rotatably mounted in said central chamber; gears rotatably mounted in said auxiliary chambers; said driven gear and the last mentioned gears being relatively shiftable axially to various meshed positions for coaction in varying the displacement of liquid in the chambers to accordingly vary the braking force applied to the driven gear; and actuating means for the relatively shiftable gearing.

3. Braking mechanism comprising a non-rotatable housing containing a body of liquid; power transferring mechanism operating in the body of liquid, and including a driven gear and a pinion gear rotatably mounted and relatively shiftable axially to various meshed positions for coaction in varying the displacement of liquid in the housing to accordingly vary the braking force applied to the driven gear; means for urging the shiftable gear to non-meshing position; means for moving the shiftable gear to various meshing positions; and means for releasably retaining the shiftable gear in any position to which it is adjustable.

4. Braking mechanism comprising a fixed housing defining a central liquid containing chamber and a plurality of circumferentially spaced auxiliary liquid containing chambers arranged about said central chamber and in communication therewith; a driven gear rotatably mounted in said central chamber; gears rotatably mounted in said auxiliary chambers; said driven gear and the last mentioned gears being relatively shiftable axially to various meshed positions for coaction in varying the displacement of liquid in the chambers to accordingly vary the braking force applied to the driven gear; means for urging the shiftable gear to non-meshing position; means for moving the shiftable gear to various meshing positions; and means for releasably retaining the shiftable gear in any position to which it is adjusted.

5. Braking mechanism comprising a fixed housing containing a body of liquid; co-operable gears operating in the body of liquid and relatively adjustable to occupy a non-meshing position and various meshed positions; means for causing such displacement of liquid in the housing as the gears are meshed and unmeshed that the liquid will set up a braking force on said gears varying in intensity in accordance with the extent to which the gears are meshed; and means for synchronizing the speeds of the gears prior to meshing so as to prevent clashing of the teeth of the gears when brought into mesh.

6. Braking mechanism comprising a fixed housing containing a body of liquid; co-operable gears operating in the body of liquid and relatively adjustable to occupy a non-meshing position and various meshed positions; means for causing such displacement of liquid in the housing as the gears are meshed and unmeshed that the liquid will set up a braking force on said gears varying in intensity in accordance with the extent to which the gears are meshed; and means providing a frictional surface on one of said gears arranged to be brought into driving engagement with another of said gears prior to meshing the gears so as to synchronize the speeds of the gears for the purpose described.

7. Braking mechanism comprising a non-rotatable housing containing a body of liquid; power transferring mechanism operating in the body of liquid and including a driven gear and a pinion gear rotatably mounted and relatively shiftable from a position wherein they are out of mesh to various meshed positions for coaction in varying the displacement of liquid in the housing to accordingly vary the braking force applied to the driven gear; means for actuating the shiftable gear; and means correlated with the gears for synchronizing the speed of the pinion gear with that of the driven gear prior to meshing the gears so as to prevent clashing the teeth of the gears when brought into mesh.

8. Braking mechanism comprising a non-rotatable housing containing a body of liquid; power transferring mechanism operating in the body of liquid and including a driven gear and a pinion gear rotatably mounted and relatively shiftable axially from a position wherein they are out of mesh to various meshed positions for coaction in varying the displacement of liquid in the housing to accordingly vary the braking force applied to the driven gear; means for actuating the shiftable gear; and means providing an annular friction surface on one of said gears disposed to be brought into peripheral contact with the other of said gears prior to meshing the gears, for coaction in equalizing the peripheral speeds of the gears in order to prevent clashing the teeth of the gears.

ROBERT MELVILLE.